United States Patent [19]

Miller et al.

[11] Patent Number: 4,750,160
[45] Date of Patent: Jun. 7, 1988

[54] MULTIPLE DISC CHANGER APPARATUS

[75] Inventors: Kenneth C. Miller, Mountain View; Laszlo Sipos; Paul L. Sipos, both of Saratoga, all of Calif.

[73] Assignee: Kubik Enterprises, Inc., Los Altos, Calif.

[21] Appl. No.: 866,779

[22] Filed: May 23, 1986

[51] Int. Cl.⁴ .......................................... G11B 17/24
[52] U.S. Cl. ..................................................... 369/37
[58] Field of Search ....................... 369/33, 34, 36, 37, 369/38, 39, 195, 199

[56] References Cited

U.S. PATENT DOCUMENTS

| | | | |
|---|---|---|---|
| 3,008,721 | 11/1961 | Corbett et al. | 369/37 |
| 3,658,347 | 4/1972 | Cheeseboro | 369/77.1 |
| 4,344,162 | 8/1982 | Foufounis | 369/37 |
| 4,567,584 | 1/1986 | Kawakami | 369/36 |

FOREIGN PATENT DOCUMENTS 235334 5/1960 Australia ................. 369/37

OTHER PUBLICATIONS

Sales Brochure, Nicco, date unknown.
Sales Brochure, Pioneer, date unknown.
Technical Data Sheet, Denon/Nippon Columbia Co., Ltd., date unknown.
Sales Brochure, Seeburg, date unknown.
Sales Brochure, Technics, date unknown.

Primary Examiner—Steven L. Stephan
Attorney, Agent, or Firm—Limbach, Limbach & Sutton

[57] ABSTRACT

An automatic disc changer apparatus operable for selecting and loading any one of a plurality of digital data discs onto the spindle of a disc player or other data input/output device is disclosed. The disc changer apparatus includes a disc storage rack that stores the discs in a toroidal arrangement surrounding the disc player, a disc selecting mechanism for selecting a disc for loading onto the data input/output device, a disc staging mechanism for transferring the selected disc from the disc storage rack to a position adjacent to the data input-/output device, and a spindle loading mechanism for loading the selected disc onto the spindle of the data input/ouput device.

17 Claims, 9 Drawing Sheets

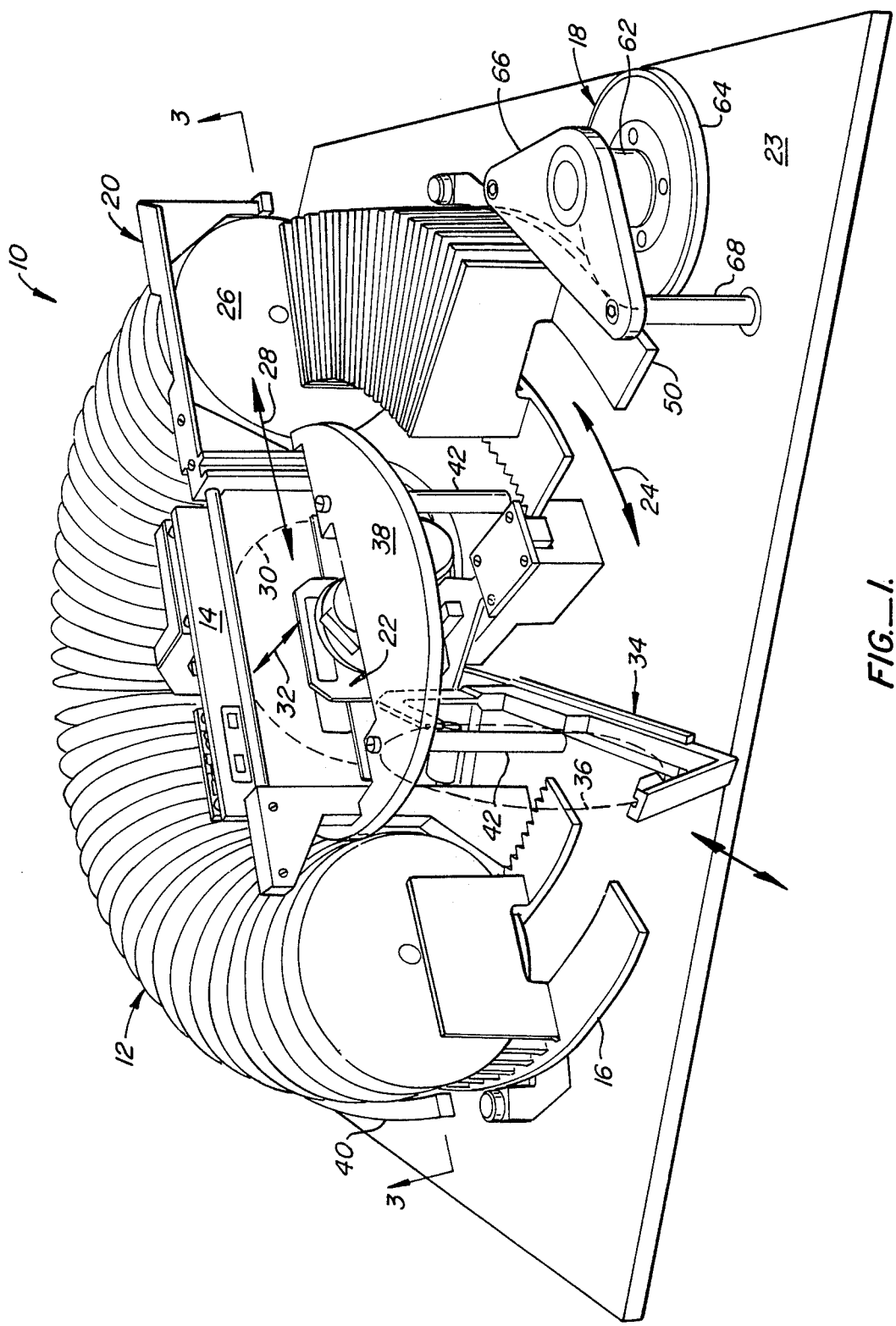
FIG.—1.

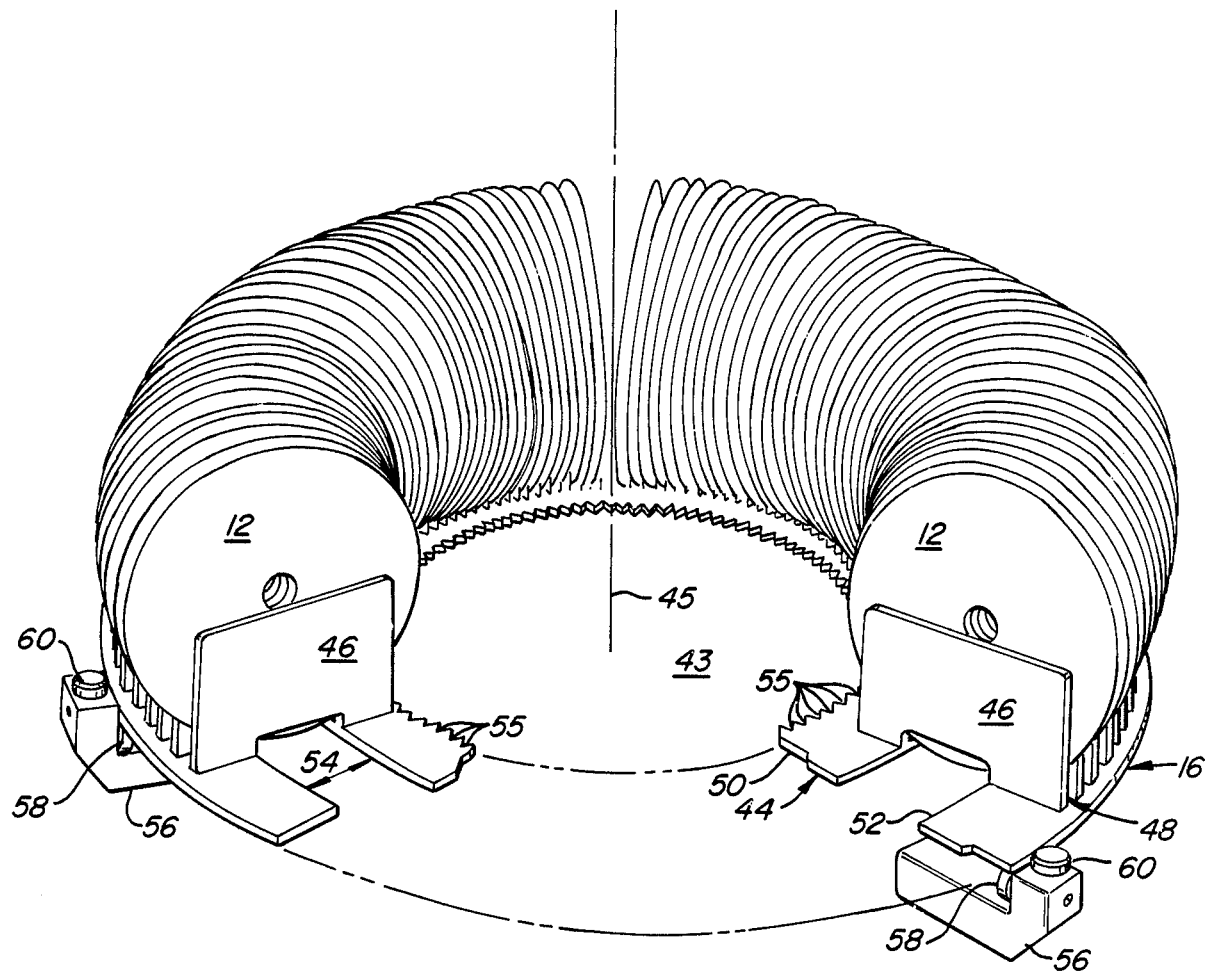
FIG._2.

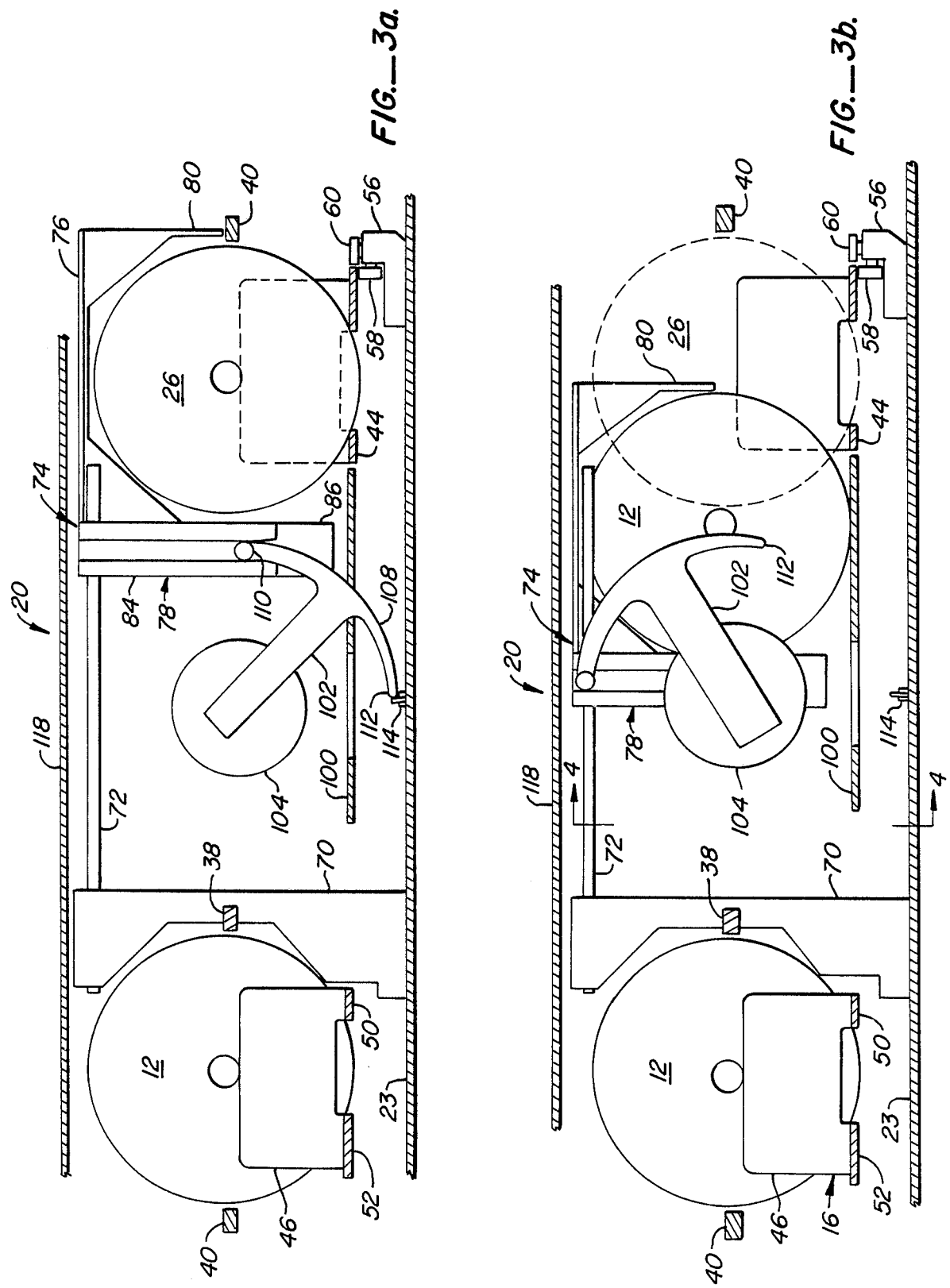

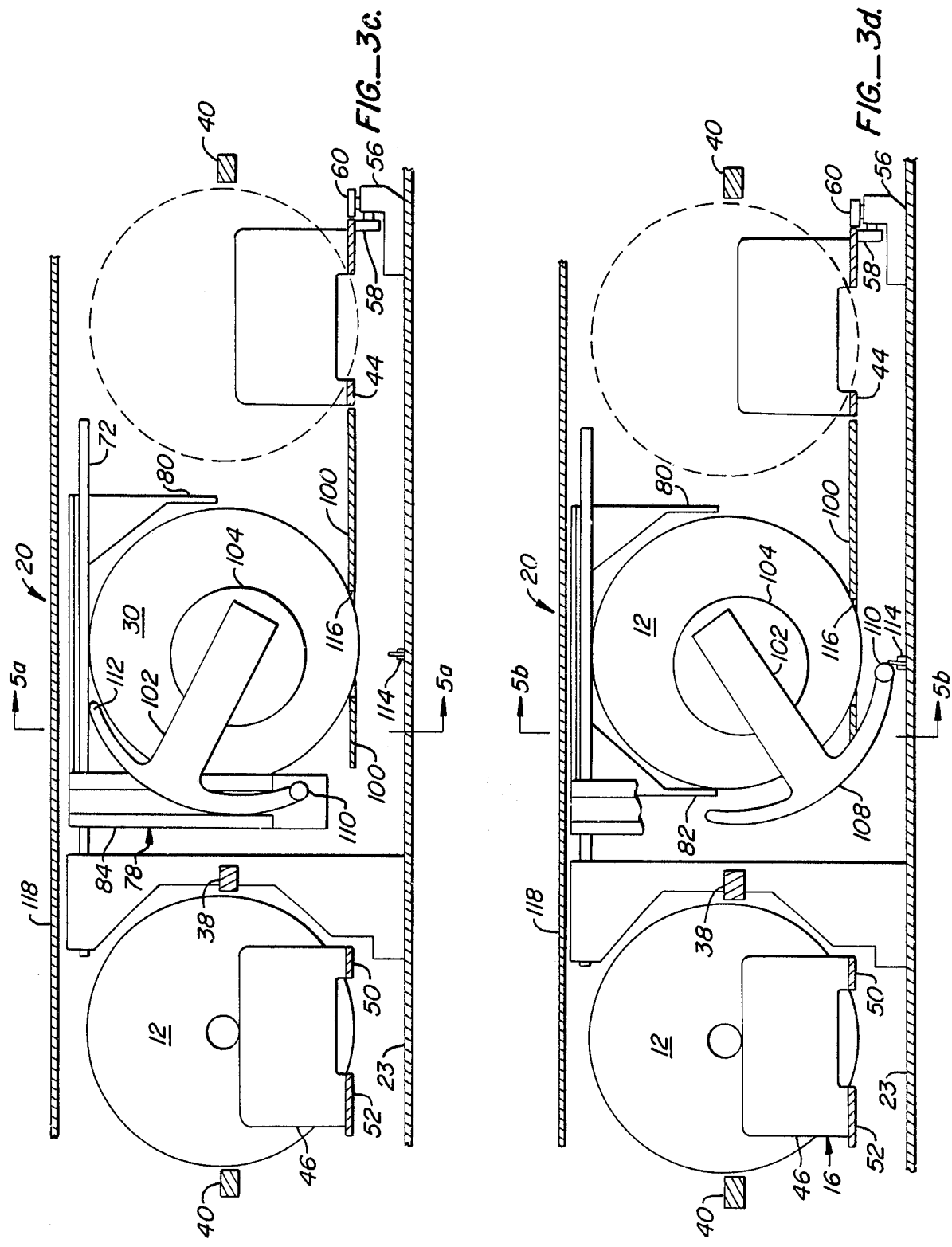

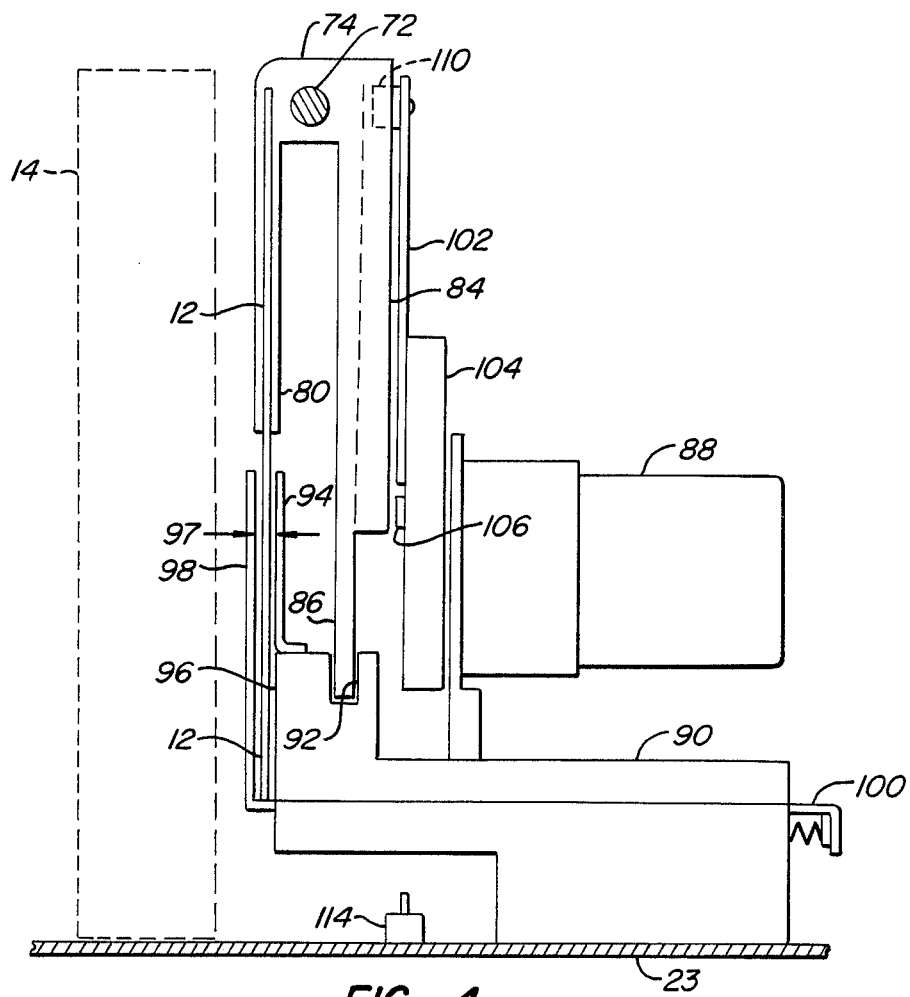
FIG._4.
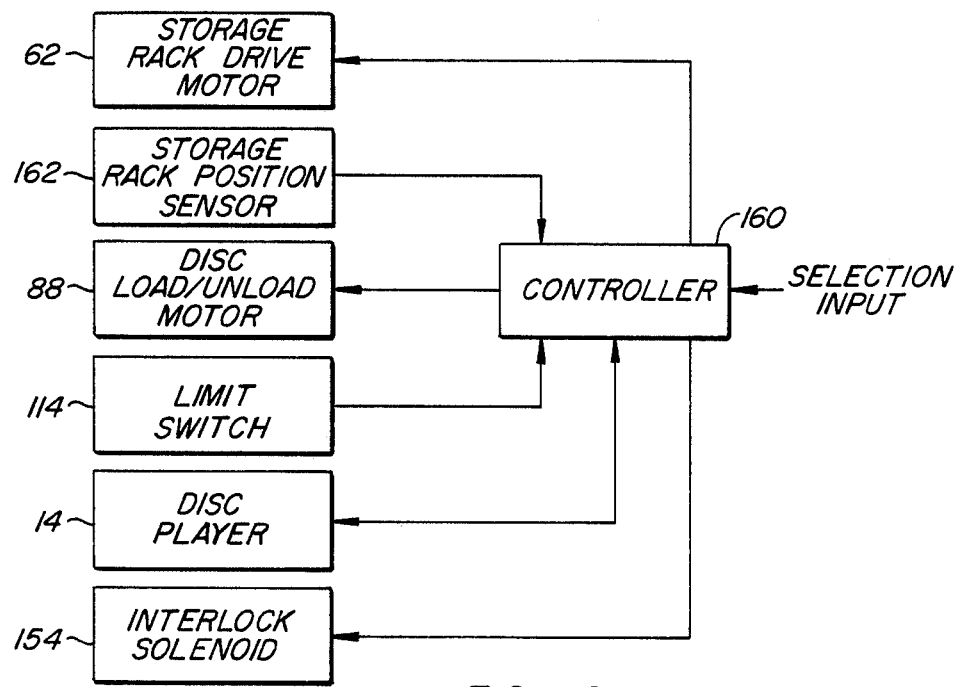
FIG._10.

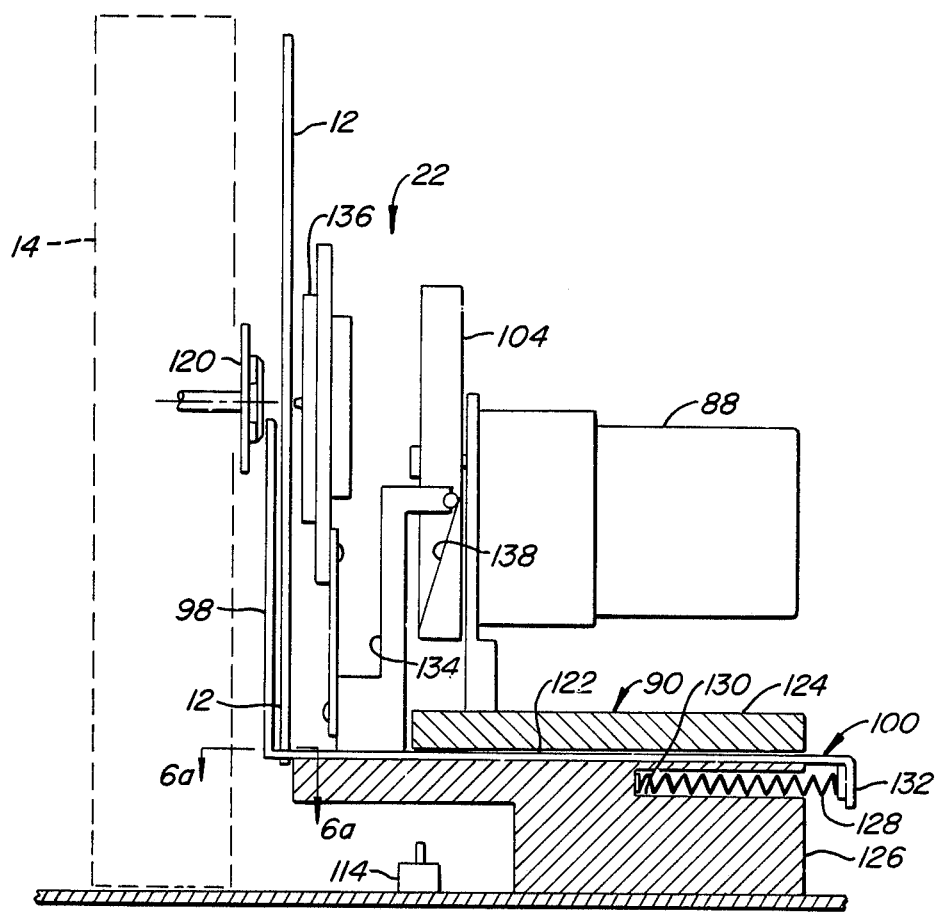
FIG._5a.
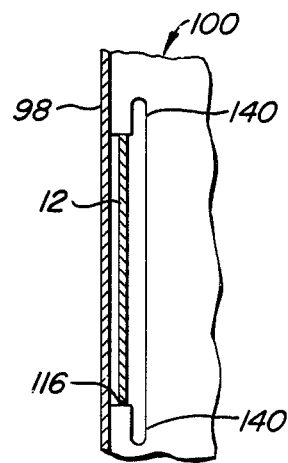
FIG._6a.

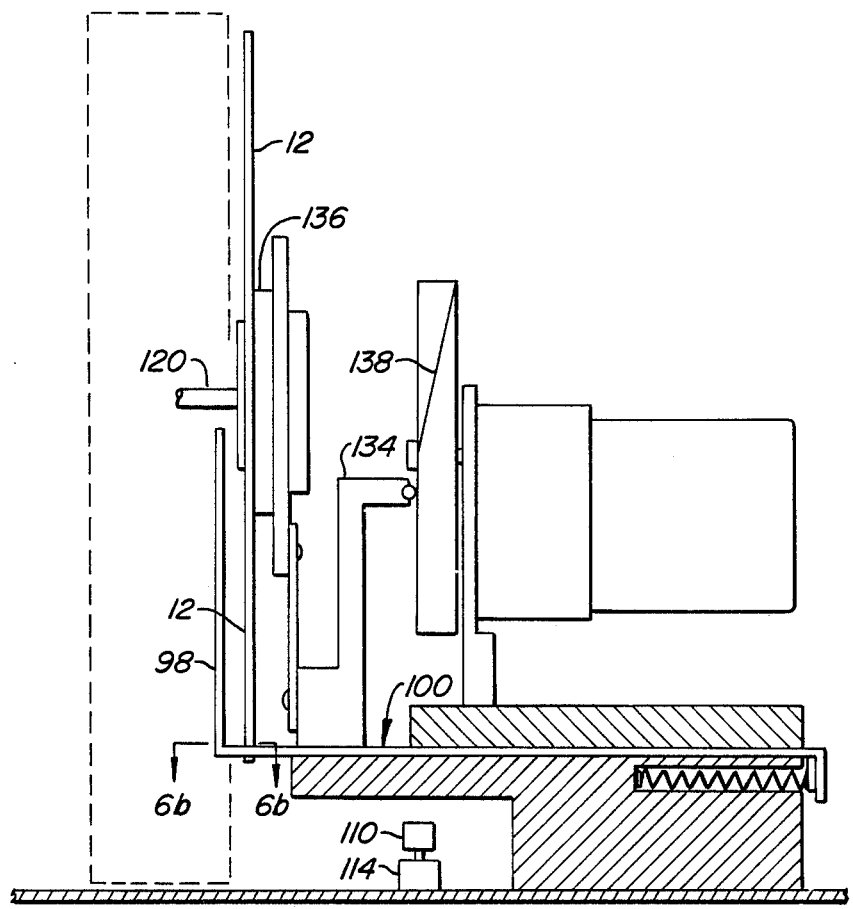
FIG._5b.
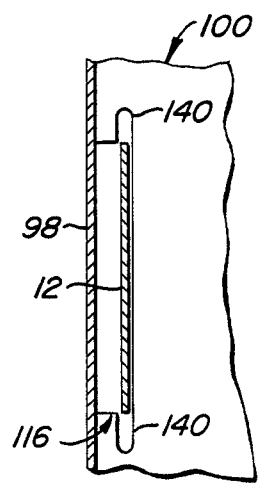
FIG._6b.

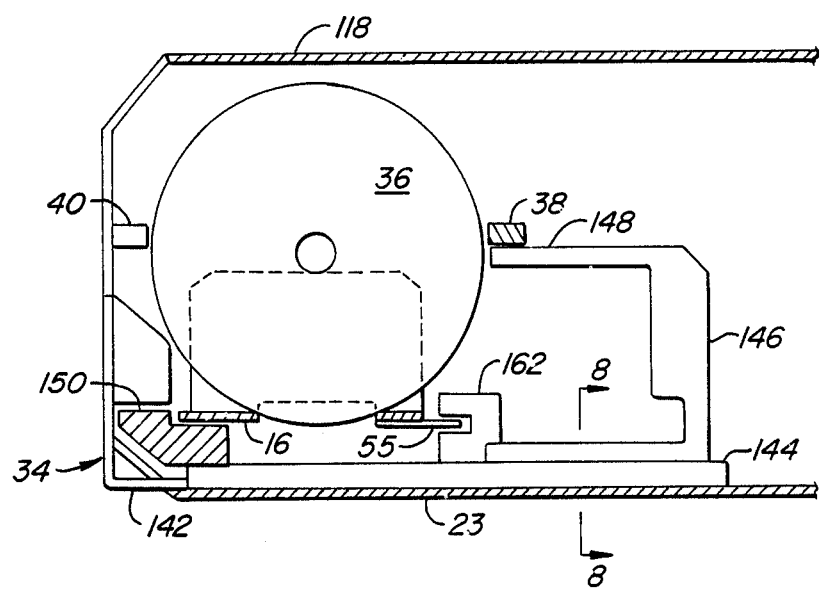
FIG._7a.
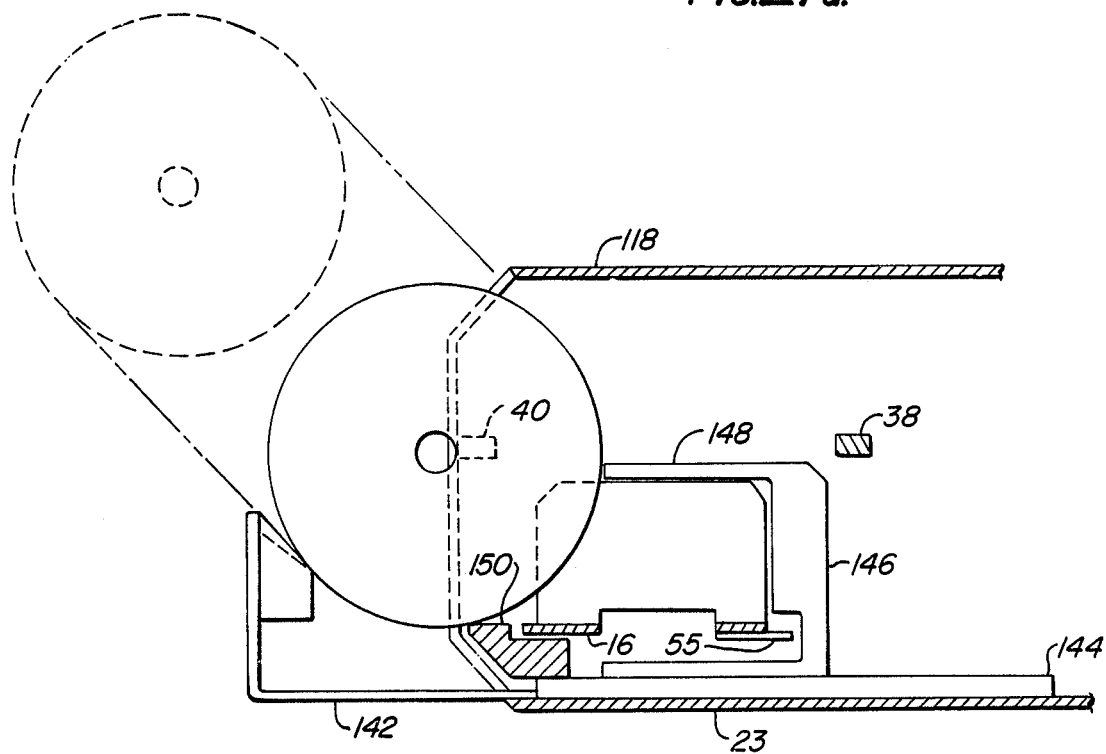
FIG._7b.
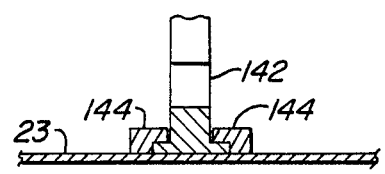
FIG._8.

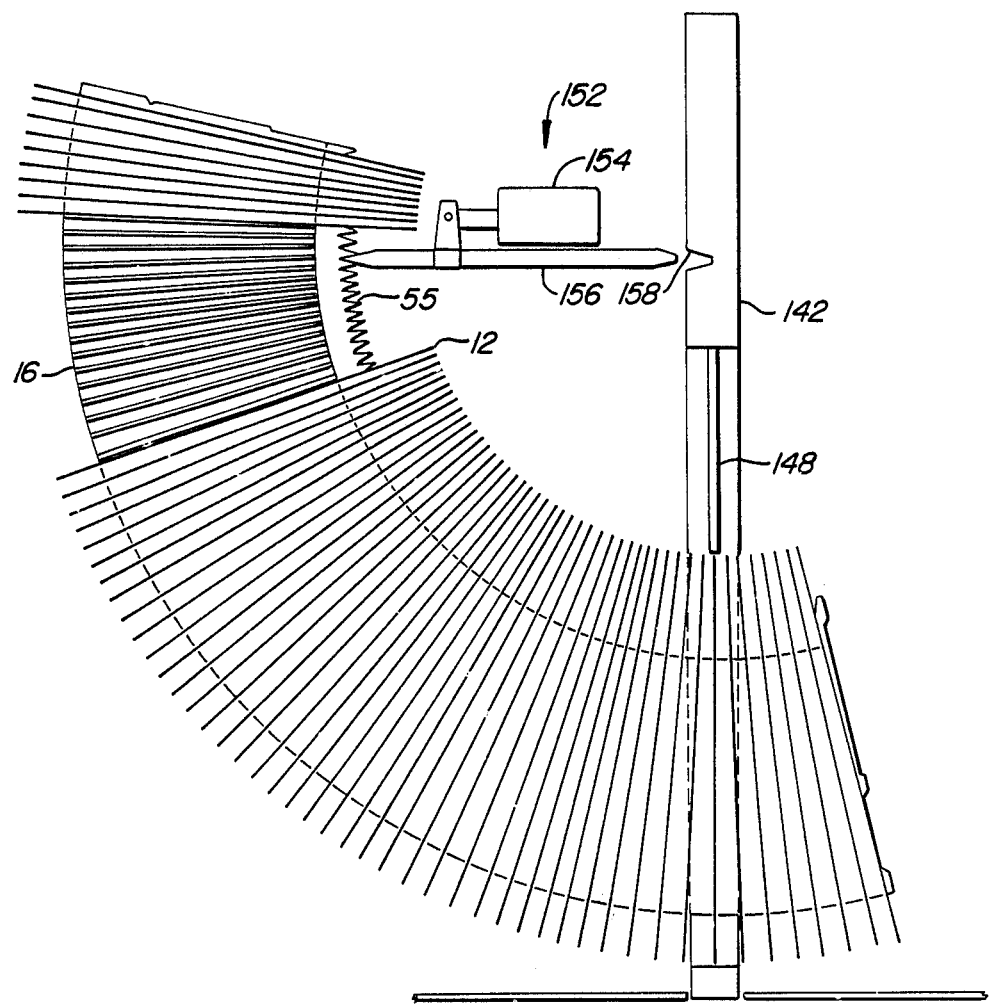
FIG._9.

MULTIPLE DISC CHANGER APPARATUS

BACKGROUND OF THE INVENTION

1. Field of the Invention

This invention relates generally to digital data storage apparatus, and relates more particularly to an automatic disc changer apparatus for selecting and loading any one of a plurality of digital data discs onto the spindle of a data input/output device.

2. Description of the Relevant Art

One relatively new form of storing digital data is optically based, in which digital data is stored on and retrieved from a digital data disc in an optically discernible form using a laser read/write head. In common use today are audio compact discs and players that recreate audio sounds based upon digitized audio information stored on the audio compact discs. The audio compact disc is a rigid plastic disc of about 4.7 inches in diameter with a concentric 0.6 inch diameter center hole. Also in use today are optically based disc systems for use as digital storage devices for computers, known as CD ROM devices, where CD ROM stands for compact disc read-only memory. Other storage devices have means for both storing data onto and retrieving data from the digital data discs.

Most currently available optical data systems are capable of accessing only a single data disc at a time, which must be loaded by hand. In some compact disc players, a drawer extends outward to accept an audio compact disc to be played, then the drawer retracts into the body of the compact disc player to load the compact disc onto a spindle of the player. In other compact disc players, a lid or cover is lifted, the audio compact disc is inserted into the compact disc player, and the lid or cover is then closed to bring the compact disc into engagement with the spindle. In operation, the spindle engages the center hole and rotates the disc, while the laser head tracks radially to read the digitally stored data in a spiral pattern.

SUMMARY OF THE INVENTION

The present invention provides an automatic disc changer apparatus that is operable for selecting and loading any one of a plurality of digital data discs onto the spindle of a disc player or other data input/output device. The disc changer apparatus includes disc storage means for storing the digital data discs in a toroidal arrangement surrounding the data input/output device, disc selecting means for selecting a digital data disc for loading onto the data input/output device by moving the disc storage means to position the selected digital data disc at a load position, disc staging means for transferring the selected digital data disc between the load position on the disc storage means and a staged position adjacent to the data input/output device, and spindle loading means for transferring the selected digital data disc between the staged position and the spindle of the data input/output device.

The preferred embodiment of the disc changer apparatus loads audio compact discs onto the spindle of a compact disc player. The disc storage means of the disc changer apparatus preferably includes a disc storage rack that rotates about a vertical axis and that retains the audio compact discs in radially disposed storage slots. The disc selecting means includes a drive motor and a position feedback sensor that rotate the disc storage rack to position a selected disc at the load position adjacent to the disc staging means. The disc staging means and the spindle loading means are mechanisms that transfer the selected disc from the disc storage rack to the spindle of the compact disc player. The disc staging means rolls the selected disc radially inward from the load position on the disc storage rack to the staged position immediately adjacent to the compact disc player, then the spindle loading means clamps the selected disc onto the spindle of the compact disc player. Preferably, both the disc staging and spindle loading mechanisms are driven by a single electric motor and gear drive.

The features of the automatic disc changer apparatus of the present invention provide many advantages over conventional digital disc players. One significant advantage is that, due to the packaging efficiency of the disc storage rack, hundreds of digital data discs can be accessed without manually selecting and loading each digital data disc into the disc player. Another advantage is that the apparatus both plays and stores the digital data discs in one compact unit. Still another advantage is that the apparatus can be coupled to a computer or other controller that, under program control, can automatically select and access digital data discs. A further advantage is that the automatic disc changer apparatus provides the means for storing a vast amount of digital data in a small area by providing access to hundreds of digital data discs.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is an overall perspective view, partially cut away, of an automatic disc changer apparatus according to the present invention.

FIG. 2 is a perspective view, partially cut away, of a disc storage rack of the disc changer apparatus of FIG. 1.

FIGS. 3a through 3d are front elevation views, partially in section, of a disc staging mechanism, and illustrate four sequential steps in the process of loading a selected disc from the disc storage rack to the spindle of a data input/output device.

FIG. 4 is a side elevation detail view, partially in section, of the disc staging mechanism of FIG. 3.

FIGS. 5a and 5b are side sectional views of a spindle loading mechanism, and illustrate two sequential steps in the process of loading a disc from a staging position to the spindle of the data input/output device. FIG. 5a is a section taken along section line 5a—5a of FIG. 3c, and FIG. 5b is a section taken along section line 5b—5b of FIG. 3d.

FIGS. 6a and 6b are sectional detail views of a portion of the disc staging mechanism. FIG. 6a is a section taken along section line 6a—6a of FIG. 5a, and FIG. 6b is a section taken along section line 6b—6b of FIG. 5b.

FIGS. 7a and 7b are side sectional views of a drawer mechanism of the disc changer apparatus of FIG. 1.

FIG. 8 is a sectional detail view of the drawer mechanism of FIG. 6a, and is taken along section line 8—8 of FIG. 7a.

FIG. 9 is a top elevation view of a drawer interlock mechanism of the disc changer apparatus of FIG. 1.

FIG. 10 is a block diagram of a control circuit utilized in the disc changer apparatus of FIG. 1.

DETAILED DESCRIPTION OF THE PREFERRED EMBODIMENT

FIGS. 1 through 10 of the drawings depict an embodiment of the present invention for purposes of illustration only. One skilled in the art will readily recognize from the following discussion that alternative embodiments of the structures and methods illustrated herein may be employed without departing from the principles of the invention described herein.

The preferred embodiment of the present invention is an automatic disc changer apparatus 10 that is capable of selecting and loading any one of a plurality of audio compact discs 12 onto the spindle of a compact disc player 14, as shown in FIG. 1. However, more generally stated, the automatic disc changer apparatus is capable of selecting and loading any one of a plurality of digital data discs onto the spindle of a data input/output device. The automatic disc changer apparatus is also capable of unloading the digital data disc from the spindle of the data input/output device and returning the disc to a storage rack, which contains the other digital data discs.

The disc changer apparatus 10 includes four subsystems: a disc storage rack 16, a storage rack positioning mechanism 18, a disc staging mechanism 20, and a spindle loading mechanism 22, all of which are mounted on or coupled to a base plate 23. These subsystems will be described briefly in reference to FIG. 1, and will be described in greater detail below. The disc storage rack 16 holds several discs 12 in a toroidal arrangement surrounding the disc player 14. The storage rack positioner 18 rotates the disc storage rack 16 about a vertical axis in either direction 24 upon command to position a selected disc at a load position 26 ready for loading onto the disc player 14. The disc staging mechanism 20 rolls the selected disc radially inward along direction 28 from the load position 26 to a staged position 30 adjacent to the disc player 14. The spindle loading mechanism 22 moves the selected disc from the staged position 30 toward the disc player 14 along direction 32 to load the selected disc onto the spindle of the disc player. To unload the disc from the disc player 14 and replace it back at the load position 26 on the disc storage rack 16, the motions of the spindle loading mechanism 22 and the disc staging mechanism 20 are reversed.

Also shown in FIG. 1 is a disc installation mechanism 34, with which a disc 36 can be inserted into or withdrawn from the disc storage rack 16. Also, an inner ring 38 and an outer ring 40 are shown in FIG. 1 as positioned concentric to the toroid formed by the discs 12 carried in the storage rack 16. The inner and outer rings 38 and 40 are positioned near a horizontal plane through the centers of the discs 12, and are mounted to the base plate 23 with standoffs 42.

The disc storage rack 16, as shown partially cut away in both FIGS. 1 and 2, provides means for storing the digital data discs in a toroidal arrangement surrounding the disc player 14. The toroidal arrangement of discs 12 define an open area 43, within which are contained the disc player 14, the disc staging mechanism 20, and the spindle loading mechanism 22. The disc storage rack 16 has a horizontally disposed base member 44 that is concentric to the vertical axis 45 of the storage rack, and has a plurality of spacer members 46 that extend from the top side of the base member. Between each two spacer members 46 is a radially extending storage slot 48 into which a disc 12 can be placed. The base member 44 is composed of two concentric rings 50 and 52 that define a concentric slot 54 therebetween. The spacer members 46 bridge the slot 54 to join the two rings 50 and 52. The lower periphery of a disc 12 stored in a storage slot 48 rests in the slot 54, with the disc contacting the outer edge of the inner ring 50 and the inner edge of the outer ring 52. The slot 54 provides radial support for the disc 12 as the disc storage rack 16 is rotated, while the spacer members 46 provide tangential support for the disc 12 as the disc storage rack is rotated. The inner edge of the inner ring 50 is serrated to form a series of detents 55, preferably one for each storage slot 48. In the preferred embodiment, storage slots are located every one and one half degrees, which provides storage slots for 240 discs. Of course, not all 240 storage slots need contain discs.

The disc storage rack 16 is supported for rotation about the vertical axis 45 by three support bearings 56, preferably mounted to the base plate 23 at 120 degree intervals. Each support bearing 56 includes a first roller 58 that rotates about a horizontal axis and contacts the underside of the base member 44, and a second roller 60 that rotates about a vertical axis and contacts the outer periphery of the base member. The first rollers 58 support the weight of the disc storage rack 16, while the second rollers 60 constrain the disc storage rack to rotate about the vertical axis 45. The disc storage rack 16 is driven in rotation by a storage rack drive motor 62 that engages the outer periphery of the base member 44 with a friction drive wheel 64. The storage rack drive motor 62 is suspended below a plate 66 that is mounted to the base plate 23 with standoffs 68. By way of means described below, the storage rack drive motor 62 rotates the disc storage rack 16 to bring a selected disc 12 to the load position 26 adjacent to the disc staging mechanism 20.

FIGS. 3a through 3d and FIG. 4 illustrate the elements of the disc staging mechanism 20. A support pillar 70 is mounted to the top of the base plate 23 and supports a guide rod 72, which extends horizontally from the support pillar and across the open area 43. Mounted for movement along the guide rod 72 is a first slide 74 that includes a forked member 76 and a slotted member 78. The forked member 76 hangs above the disc 12, with two prongs 80 and 82 (FIG. 3d) protruding downward on both sides of the disc. The prong 80 is thin enough to fit between the two discs flanking the disc at the load position 26. The slotted member 78, which protrudes downward from the guide rod 72, includes a slotted portion 84 and a flat portion 86.

As shown in FIG. 4, a motor 88 is mounted to the base plate 23 by a support structure 90. The lower edge of the flat portion 86 of the slotted member 78 rides in and is guided by a groove 92 in the support structure 90 during movement of the first slide 74. Attached to the support structure 90 is a fence 94 that extends upward from the upper surface of the support structure. The vertical face 96 of the support structure 90 and the fence 94 form one side of a guide channel 97 that guides the disc 12 during its movement between the load position on the disc storage rack 16 and the staging position adjacent to the disc player 14. The other side of the guide channel 97 is formed by a flange 98 that is part of a second slide 100. A pivot arm 102 and a cam 104 are attached to the output shaft 106 of the motor 88 for rotation therewith. Preferably, the pivot arm 102 and the cam 104 rotate about three quarters of a revolution during each load or unload cycle, and are driven at a substantially constant angular velocity.

As shown in FIGS. 3a through 3d, the pivot arm 102 is, in general, shaped like a T, but with curved upper arms 108 that extend through an arc of approximately ninety degrees. At the end of one of the upper arms 108 is a slot follower 110 that engages the slotted portion 84 of the slotted member 78. At the position shown in FIG. 3a, the other end 112 of the upper arms 108 actuates a limit switch 114 that is mounted under the support structure 90. FIGS. 3a, 3b, 3c, and 3d respectively shown zero, one quarter, one half, and three quarters of a revolution of the pivot arm 102.

In operation, the disc staging mechanism 20 rolls a disc 12 between the load position 26 on the disc storage rack 16, shown in FIG. 3a, and the staged position 30 adjacent to the disc player 14, shown in FIG. 3c. The pivot arm 102 engages the slotted member 78 to move the first slide 74 and the disc 12 between the position shown in FIG. 3a and the position shown in FIG. 3c. When the motor 88 starts to rotate the pivot arm 102, the motion of the slot follower 110 is nearly parallel to the direction of the slot in the slotted member 78, so that the first slide 74 and the disc accelerate slowly from rest. As the first slide 74 starts to move inward, the outer prong 80 pushes on the periphery of the disc, causing the disc to lift slightly upward and roll onto the upper surface of the base member 44. From there, prong 80 pushes on the periphery of the disc to roll the disc onto the second slide 100 and into the guide channel 97, as the pivot arm 102 continues to move the first slide 74 inward. At the position shown in FIG. 3b, the disc 12 is half way to the staged position and the first slide 74 is traveling at its fastest speed because the direction of motion of the slot follower 110 is at that point perpendicular to the direction of the slot. From the midpoint, the first slide 74 and the disc decelerate until they stop at the position shown in FIG. 3c. The disc 12 comes to rest in a pocket 116 in the second slide 100, and the slot follower 110 disengages from the slot in the slotted member 78. The pivot arm 102 continues to rotate to the position shown in FIG. 3d to actuate the spindle loading mechanism 22, as described below. At the position shown in FIG. 3d, the slot follower 110 actuates the limit switch 114 from the other direction.

Note in FIG. 3 the placement of the inner and outer rings 38 and 40. Both rings are positioned in a horizontal plane that passes through a point near the centers of the discs 12. In combination with a lid 118, the rings ensure that the discs 12 remain seated in the disc storage rack 16 even during rough handling. The inner ring 38 is preferably continuous except where the disc is loaded into the center region by the disc staging mechanism 20. The outer ring 40 is preferably continuous except where the disc is inserted into and withdrawn from the disc storage rack by the disc installation mechanism 34.

The spindle loading mechanism 22, shown in FIGS. 5a and 5b, operates during the last quarter revolution of the pivot arm 102 and cam 104 to load the disc 12 onto the spindle 120 of the disc player 14. This action is accomplished by the cam 104 pushing the second slide 100 and the disc 12 toward the disc player 14. The second slide 100 is movable between a retracted position, shown in FIG. 5a, and an extended position, shown in FIG. 5b. A guide member 122 part of the second slide 100 is sandwiched between two plates 124 and 126 of the support structure 90. A compression spring 128 placed in a blind hole 130 in the lower plate 126 pushes against a flange 132 of the second slide 100 to bias the second slide toward its retracted position. Attached to the guide member 122 for movement therewith is a cam follower 134 that engages the surface of the cam 104, and a backing plate 136 that rotates about the spindle axis. During the last quarter revolution of the cam 104, an inclined surface 138 of the cam causes the cam follower 134 and the attached second slide 100 to move toward the spindle of the disc player 14. As the second slide 100 moves toward the disc player 14, the spindle 120 engages the central hole of the disc 12. At the position shown in FIG. 5b, the disc 12 is loaded onto the spindle 120, and the backing plate 136 provides a backing force to ensure that the disc rotates with the spindle.

In FIG. 6a, wherein the position of the disc staging mechanism 20 and the spindle loading mechanism 22 correspond to that shown in FIGS. 3c and 5a, the lower portion of the disc 12 rests on the inner edges of the pocket 116 in the second slide 100. In FIG. 6b, wherein the position of the disc staging mechanism 20 and the spindle loading mechanism 22 correspond to that shown in FIGS. 3d and 5b, the relative spacing between the flange 98 and the disc 12 has widened because the travel of the disc is halted by the spindle 120, but the travel of the second slide 100 is not. This movement of the disc 12 relative to the second slide 100 moves the disc into an area 140 where the pocket 116 is extended. The pocket 116 thus provides clearance for the disc 12 when loaded onto the spindle 120, so that the disc will not drag against anything as it is rotated during playing.

To move the disc 12 the other way, from the staged position and back to the load position in the disc storage rack 16, the motion of the motor 88 is reversed. As the pivot arm 102 rotates from the position shown in FIG. 3d to the position shown in FIG. 3c, the second slide 100 moves from the extended position shown in FIG. 5b to the retracted position shown in FIG. 5b. During that movement of the second slide 100, the upright flange 98 of the second slide removes the disc 12 from the spindle 120 and places the disc into the pocket 116 of the second slide and in line with the guide channel 97. Then, the pivot arm rotates from the position shown in FIG. 3c to the position shown in FIG. 3a to move the first slide 74 back out to the disc storage rack 16. This movement of the first slide 74 causes the inner prong 82 to push on the disc 12, causing the disc to roll it down the guide channel 97 and into the load position 26 on the disc storage rack 16.

The disc installation mechanism 34, as shown in FIGS. 7a, 7b, and 8, allows a disc 36 to be inserted into or withdrawn from the disc storage rack 16. Included in the disc installation mechanism 34 is a drawer 142 that is guided by two side rails 144 fixed to the base plate 23, which allow the drawer to slide in and out between the positions shown in FIGS. 7a and 7b. At the interior end of the drawer 142 is an upright member 146 that supports an outwardly protruding arm 148. The arm 148 is thin enough to fit in between the two discs flanking the disc to be removed.

When the drawer 142 is retracted, as shown in FIG. 7a, the arm 148 and upright member 146 are positioned away from the disc storage rack 16 under the inner ring 38. The drawer 142 remains in this position until such time as a disc is to be installed into or removed from the disc storage rack 16. At such time, the storage slot containing the disc to be removed or into which the disc is to be installed is positioned over the center of the drawer 142 at 36. Then, the drawer 142 is manually extended, which causes the arm 148 to push on the disc, and the disc to roll along the base member 44 of the disc storage rack 16, through a gap in the outer ring 40, and onto a platform 150, as shown in FIG. 7b. From there, the center hole 152 of the disc can be grasped and the disc removed, or a disc to be inserted can be placed in the drawer 142. Retracting the drawer causes the disc to roll from the platform 150 and into the disc storage rack 16. Note that when a disc is inserted, a portion of the disc is inserted into the storage slot to eliminate the possibility of jamming during retraction of the drawer.

Alternatively, the disc installation mechanism 34 could consist of a pivoting arm rather than a sliding drawer. Such a pivoting arm would move a disc to be removed from the disc storage rack 16 to a position partially outside of the disc changer apparatus 10 by a pivoting motion, rather than a linear motion. The pivoting arm or the drawer 142 provides transport means for installing a disc into and removing a disc from the disc storage rack.

An interlock device 152, shown in FIG. 9, is used to prevent the disc storage rack 16 from rotating when the drawer 142 or the disc staging mechanism 20 is in use and to prevent the drawer from extending when the disc storage rack is rotating. The interlock device 152 includes a solenoid 154 and a pawl 156. The solenoid drives the pawl 156 between two positions: the one shown in FIG. 9 wherein the pawl engages one of the detents 55 in the disc storage rack 16, and one in which the pawl engages a notch 158 in the drawer 142. In the first position, the pawl 156 aligns and locks the position of the disc storage rack 16 so that one storage slot is at the load position 26 and another is at the install/remove position 36. With the disc storage rack 16 locked in this manner, either a disc can be loaded onto or unloaded from the disc player 14, or a disc can be installed into or removed from the disc storage rack 16. Since this position will be in effect during most of the time, e.g., when the disc player 14 is playing a disc, it is preferable that the pawl be spring biased toward this position so that the solenoid need not be constantly energized. When the time comes to rotate the disc storage rack 14 to position a selected disc 12 at either the load position 26 or the install/remove position 36, then the pawl must be removed from the detent 55 and inserted into the notch 158. Note that the disc storage rack 14 can not be unlocked if the drawer 142 is extended, because in such a case the notch would not line up with the pawl 156 and, thus, could not be withdrawn from the detent 55.

Referring now to FIG. 10, the rotary positioning of the disc storage rack 16 is provided by a controller 160 and a storage rack position sensor 162, in addition to the above described storage rack drive motor 62. The storage rack position sensor 162, shown in FIG. 7a, senses the rotation of the disc storage rack 16 by counting the number of detents 55 that move past the sensor by optical or other non-contacting means. Alternatively, position sensing could be accomplished by sensing the movement of a semi-transparent encoded wheel attached to the disc storage rack 16.

The controller 160, which is preferably a microprocessor, is connected to the various sensors and motors of the disc changer apparatus 10. The controller 160 receives sensor inputs from the storage rack position sensor 162, which defines the rotary position of the disc storage rack 16, and from the limit switch 114, which indicates whether the disc staging mechanism 20 is extended, retracted, or somewhere in between. the controller 160 sends out control signals to the storage rack drive motor 62 to position the disc storage rack 16, to the motor 88 to actuate the disc staging and spindle loading mechanisms 20 and 22, and to the interlock solenoid 154 to lock and unlock the drawer 142 and the disc storage rack. The controller 160 is also coupled to the disc player 14 for relaying selection information and for responding to disc player signals.

From the above description, it will be apparent that the invention disclosed herein provides a novel and advantageous apparatus for an automatic disc changer apparatus for selecting and loading any one of a plurality of digital data discs onto the spindle of a data input-/output device. The foregoing discussion discloses and describes merely exemplary methods and embodiments of the present invention. As will be understood by those familiar with the art, the invention may be embodied in other specific forms without departing from the spirit or essential characteristics thereof. For example, instead of audio compact discs, the discs 12 could be CD ROM discs, or the disc player 14 could be a data input/output device. Accordingly, the disclosure of the present invention is intended to be illustrative, but not limiting, of the scope of the invention, which is set forth in the following claims.

What is claimed is:

1. An automatic disc changer apparatus for selecting and loading any one of a plurality of digital data discs onto a data input/output device that is operable for reading digital data from or writing digital data to the selected digital data disc, said apparatus comprising:
   a base plate;
   a toroidally-shaped storage rack mounted for rotation with respect to said base plate about a vertical axis, wherein said storage rack includes a base member having a horizontal upper surface and wherein said storage rack is adapted for storing digital data discs in a toroidal arrangement;
   means for mounting the data input/output device to said base plate at the center of said storage rack, wherein a digital data disc loaded onto the data input/output device is positioned at substantially the same elevation as the digital data discs stored in said storage rack;
   disc selecting means coupled to said storage rack for selecting a digital data disc for loading onto the data input/output device by rotating said storage rack to position the selected digital data disc at a load position;
   disc staging means for transferring a selected digital data disc between said load position on said storage rack and a staged position adjacent to the data input/output device, wherein said disc staging means includes a horizontal surface disposed between said load and said staged positions and substantially coplanar with the horizontal upper surface of said storage rack, and includes means for rolling the selected digital data disc along the horizontal surface in a horizontal and radial direction between said load position and said staged position, wherein said disc staging means is located substantially within the center of said storage rack; and spindle loading means for transferring the selected digital data disc between said staged position and a position at which the disc is coupled to a spindle of the data input/output device, wherein said spindle loading means is located substantially within the center of said storage rack.

2. An apparatus as recited in claim 1 wherein said storage rack includes a toroidally-shaped base member having a horizontal upper surface and a plurality of radially-disposed spacer members extending vertically upward from said upper surface, wherein adjacent spacer members define radially-extending storage slots for laterally retaining digital data discs stored in said storage rack, wherein said upper surface includes a depression within each storage slot for receiving the lower edge of a digital data disc placed therein and for radially retaining the disc during rotation of said storage rack, and wherein said storage rack provides clearance both radially inward and radially outward of each of said storage slots for rolling a digital data disc along the horizontal upper surface.

3. An apparatus as recited in claim 2 wherein said base member of said storage rack includes inner and outer concentric rings having upper surfaces thereof forming the horizontal upper surface, and wherein said concentric rings are spaced apart to form a concentric slot therebetween that provides said depression within said storage slots.

4. An apparatus as recited in claim 1 further including a stationary outer ring positioned outside the outer periphery of the digital data discs stored in said storage rack, including a stationary inner ring positioned inside the inner periphery of the digital data discs stored in said storage rack, and including a lid mounted above said storage rack and the data input/output device, wherein said outer and inner rings and said lid restrain movement of the digital data discs stored in said storage rack except for movement in a horizontal and radially inward direction at said load position for loading onto the data input/output device and movement in a horizontal and radially outward direction at a particular position for removal from said storage rack.

5. An apparatus as recited in claim 1 further comprising disc installation means apart from said disc staging means for installing digital data discs into and removing digital data discs from said storage rack, said disc installation means including an installation mechanism for transporting a digital data disc between a position outside of said apparatus and a selected storage slot in said storage rack without the use of said disc staging means, wherein said disc selecting means is further operable for positioning a selected storage slot adjacent to said installation mechanism for installation of a digital data disc into or removal of a digital data disc from said selected storage slot.

6. An apparatus as recited in claim 5 wherein said disc installation means further includes interlock means for locking said installation mechanism in a position that does not interfere with the rotation of said storage rack when said installation mechanism is not in use, and for locking the rotary position of said storage rack when said installation mechanism is in use.

7. An apparatus as recited in claim 6 wherein said interlock means includes a pawl that is movable between two positions, wherein said pawl in a first position engages said installation mechanism to lock it in a position that does not interfere with the rotation of said storage rack, and wherein said pawl in a second position engages said storage rack to lock the position of said storage rack.

8. An apparatus as recited in claim 5 wherein said installation mechanism is movable between an extended position and a retracted position, wherein a digital data disc inserted into said installation mechanism at said extended position extends partially into a storage slot, and wherein movement of said installation mechanism from said extended position to said retracted position rolls the digital data disc into that storage slot.

9. An apparatus as recited in claim 1 wherein said means for rolling includes a forked member that is supported for movement in a horizontal and radial direction and includes forked member drive means for driving said forked member horizontally in a radially inward or radially outward direction, wherein said prongs of said forked member bracket the selected digital disc, wherein one prong of said forked member contacts the circumference of the selected digital data disc to roll it radially inward from said load position to said staged position, and wherein another prong of said forked member contacts the circumference of the selected digital data disc to roll it radially outward from said staged position to said load position.

10. An apparatus as recited in claim 9 wherein said forked member includes a slotted member attached thereto and extending orthogonally to the direction of travel of said forked member, and wherein said forked member drive means includes a pivotable arm having a follower that engages said slotted member to drive said forked member and selected digital data disc radially inward and outward.

11. An apparatus as recited in claim 10 wherein said follower of said pivotable arm engages said slotted member at the limits of travel of said forked member in a direction substantially parallel to the slot of said slotted member.

12. An apparatus as recited in claim 1 wherein said spindle loading means incudes clamping means disposed for movement parallel to the axis of the spindle of the data input/output device for clamping the selected digital data disc onto the spindle, wherein both said disc staging means and said clamping means are driven by a rotary mechanism having an axis parallel to said spindle axis, wherein said rotary mechanism includes means for driving said disc staging means and the selected digital data disc between said load and staged positions during one portion of the rotation of said rotary mechanism and includes means for driving said clamping member and the selected digital data disc between said staged position and the spindle during another portion of the rotation of said rotary mechanism, and wherein the direction of rotation of said rotary mechanism determines the direction of movement of said disc staging means, said clamping member, and the selected digital data disc.

13. An apparatus as recited in claim 12 wherein said means for driving said clamping member includes a cam mechanism that engages said clamping means to drive said clamping means and the selected digital data disc between said staged position and the spindle of the data input/output device.

14. An apparatus as recited in claim 1 wherein said disc staging means is movable between a first position at which said selected digital data disc is located at said load position on said storage rack and a second position at which said selected digital data disc is located at said staged position adjacent to the data input/output device, and wherein said disc staging means provides clearance with respect to said storage rack and the digital data discs stored therein so that said storage rack can be rotated when said disc staging means is at either said first position or said second position.

15. An apparatus as recited in claim 1 wherein said horizontal surface of said disc staging means includes a pocket recessed below the said horizontal surface and disposed adjacent to said staged position, wherein said pocket is operable for receiving the lower edge of said selected digital data disc and aligning the disc with respect to the spindle of the data input/output device.

16. An automatic disc changer apparatus for selecting and loading any one of a plurality of digital data discs onto a data input/output device that is operable for reading digital data from or writing digital data to the selected digital data disc, said apparatus comprising:

a base plate;

a toroidally-shaped storage rack mounted for rotation with respect to said base plate about a vertical axis and adapted for storing digital data discs in a toroidal arrangement, wherein said storage rack includes a base member having a horizontal upper surface and having a plurality of radially-disposed spacer members extending vertically upward from said upper surface, wherein adjacent spacer members define radially-extending storage slots for laterally retaining digital data discs stored in said storage rack, wherein said upper surface includes means within each storage slot for receiving the lower edge of a digital data disc placed therein and for radially retaining the disc during rotation of said storage rack, and wherein said storage rack provides clearance both radially inward and radially outward of each of said storage slots for horizontal movement of a digital data disc placed therein;

means for mounting the data input/output device to said base plate through the center of said toroidal arrangement of digital data discs such that a digital data disc loaded onto the data input/output device is positioned at substantially the same elevation as the digital data discs stored in said storage rack;

a stationary outer ring positioned outside the outer periphery of the toroidal arrangement of digital data discs stored in said storage rack and a stationary inner ring positioned inside the inner periphery of the toroidal arrangement of digital data discs stored in said storage rack for radially retaining the digital data discs stored in said storage rack;

a lid mounted above said storage rack and the data input/output device and operable for vertically retaining the digital data discs stored in said storage rack;

disc selecting means coupled to said storage rack for selecting a digital data disc for loading onto the data input/output device by rotating said storage rack to position the selected digital data disc at a load position;

a ramp disposed between said load position and a staged position adjacent to the data input/output device, wherein said ramp has a top surface positioned at substantially the same elevation as the top surface of said base member of said storage rack, and wherein said ramp is operable for supporting a digital data disc being transferred between said load and staged positions;

disc transport means for transferring a selected digital data disc between said load position on said storage rack and a spindle of the data input/output device, wherein said disc transport means is located substantially within the center of said storage rack, wherein said disc transport means includes a linear slide mechanism, a clamping mechanism, and a rotary drive mechanism that is operable for rotary movement, wherein one portion of the rotation of said rotary drive mechanism drives said linear slide mechanism and the selected digital data disc between said load position and said staged position adjacent to the spindle of the data input/output device, wherein another portion of the rotation of said rotary mechanism drives said clamping mechanism and the selected digital data disc between said staged position and the spindle of the data input/output device, and wherein the direction of rotation of said rotary mechanism determines the direction of movement of said linear slide mechanism, said clamping mechanism, and the selected digital data disc;

wherein said linear slide mechanism includes a forked member that is supported for movement in a horizontal and radial direction and has two prongs that bracket the selected digital data disc, wherein said forked member has one prong that contacts the circumference of the selected digital data disc to roll it from said load position to said staged position and has another prong that contacts the circumference of the selected digital data disc to roll it from said staged position to said load position, and includes a slotted member attached thereto and extending orthogonally to the direction of travel of said forked member, and wherein said forked member of said linear slide mechanism provides clearance for said storage rack to rotate when said forked member is positioned at either said load position or said staged position;

wherein said clamping mechanism includes a clamp slide that is operable for movement parallel to the spindle axis and is operable for clamping the selected digital data disc against the spindle of the data input/output device; and wherein said rotary drive mechanism includes a pivotable arm having a follower that is operable for engaging said slotted member during said one portion of the rotation of said rotary drive mechanism to drive said linear slide mechanism and the selected digital data disc radially inward and outward, and includes a cam mechanism that engages said clamp slide during said another portion of the rotation of said rotary drive mechanism to drive said clamp slide and the selected digital data disc between said staged position and the spindle of the data input/output device.

17. An apparatus as recited in claim 16 further comprising an installation mechanism for transporting a digital data disc between a position outside of said apparatus and a selected storage slot in said storage rack, and comprising interlock means for locking said installation mechanism in a position that does not interfere with the rotation of said storage rack when said installation mechanism is not in use, and for locking the rotary position of said storage rack when said installation mechanism is in use; wherein said disc staging means is further operable for positioning a selected storage slot adjacent to said installation mechanism for installation of a digital data disc into or removal of a digital data disc from said selected storage slot.

* * * * *